United States Patent
Soldati et al.

(10) Patent No.: US 10,485,011 B2
(45) Date of Patent: Nov. 19, 2019

(54) METHOD FOR SCHEDULING AND/OR MUTING OF RADIO RESOURCES IN A WIRELESS COMMUNICATION SYSTEM

(71) Applicant: HUAWEI TECHNOLOGIES CO., LTD., Shenzhen (CN)

(72) Inventors: Pablo Soldati, Kista (SE); Jaap Van De Beek, Taby (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 59 days.

(21) Appl. No.: 15/061,008

(22) Filed: Mar. 4, 2016

(65) Prior Publication Data
US 2016/0192382 A1 Jun. 30, 2016

Related U.S. Application Data

(63) Continuation of application No. PCT/EP2013/068444, filed on Sep. 6, 2013.

(51) Int. Cl.
*H04L 12/751* (2013.01)
*H04L 29/06* (2006.01)
(Continued)

(52) U.S. Cl.
CPC ..... *H04W 72/1231* (2013.01); *H04W 72/082* (2013.01)

(58) Field of Classification Search
CPC ........... H04W 72/1231; H04W 72/082; H04W 72/1263
See application file for complete search history.

(56) References Cited

U.S. PATENT DOCUMENTS 7,042,858 B1 * 5/2006 Ma .................. H04L 1/0618
370/208
8,705,506 B2 4/2014 Khandekar et al.
(Continued)

FOREIGN PATENT DOCUMENTS

CN 101932080 A 12/2010
CN 102625997 A 8/2012
(Continued)

OTHER PUBLICATIONS

Huawei, HiSilicon, "CoMP Schemes for Non-Ideal Backhaul and Inter-eNB Signalling", 3GPP TS RAN WGl Meeting #74, Barcelona, Spain, Aug. 19-23, 2013.
(Continued)

*Primary Examiner* — Brian S Roberts
*Assistant Examiner* — Abusayeed M Haque
(74) *Attorney, Agent, or Firm* — Staas & Halsey LLP (57) ABSTRACT

The present invention relates to a Method for scheduling and/or muting radio resources in a wireless communication system, said wireless communication system comprising a plurality of network nodes and a plurality of user nodes; the method comprising the steps of: measuring, by at least one user node, received signal strength of radio signals transmitted from one or more network nodes so as to obtain received signal quality and/or interference associated with said one or more network nodes; arranging, by said user node, the received signal quality and/or interference associated with said one or more network nodes in an order or a ranking with respect to at least one radio signal criterion; signalling, by said user node, said order or ranking to at least one network node; and scheduling and/or muting radio resources based on said signalled order or ranking.

20 Claims, 7 Drawing Sheets

(51) Int. Cl.
*H04W 72/12* (2009.01)
*H04W 72/08* (2009.01)

(56) References Cited

U.S. PATENT DOCUMENTS

| | | | |
|---|---|---|---|
| 8,843,150 B2 | 9/2014 | Yu et al. | |
| 2007/0232341 A1 | 10/2007 | Sakata | |
| 2008/0285477 A1* | 11/2008 | Kuroda | H04L 1/0026 |
| | | | 370/252 |
| 2009/0181691 A1 | 7/2009 | Kotecha et al. | |
| 2010/0202308 A1 | 8/2010 | Gorokhov et al. | |
| 2010/0323745 A1 | 12/2010 | Chen et al. | |
| 2012/0046028 A1 | 2/2012 | Damnjanovic et al. | |
| 2012/0113843 A1 | 5/2012 | Wafta et al. | |
| 2012/0295623 A1* | 11/2012 | Siomina | G01S 5/0263 |
| | | | 455/436 |
| 2013/0157680 A1* | 6/2013 | Morita | H04W 52/244 |
| | | | 455/452.2 |
| 2013/0210428 A1* | 8/2013 | Manna | H04W 52/0245 |
| | | | 455/434 |
| 2013/0235746 A1* | 9/2013 | Patel | H04W 72/0453 |
| | | | 370/252 |
| 2013/0331081 A1* | 12/2013 | Rune | H04B 7/0408 |
| | | | 455/418 |
| 2014/0036664 A1* | 2/2014 | Han | H04W 4/70 |
| | | | 370/230 |
| 2014/0045510 A1* | 2/2014 | Yue | H04W 72/042 |
| | | | 455/450 |
| 2014/0153476 A1* | 6/2014 | Wang | H04W 4/06 |
| | | | 370/312 |
| 2014/0169275 A1 | 6/2014 | Nagata et al. | |
| 2014/0341069 A1* | 11/2014 | Alon | H04W 48/16 |
| | | | 370/254 |

FOREIGN PATENT DOCUMENTS

| | | |
|---|---|---|
| CN | 102883330 A | 1/2013 |
| DE | 102 05 103 A1 | 7/2003 |
| EP | 1 841 276 A2 | 10/2007 |
| EP | 2 451 214 A1 | 5/2012 |
| JP | 2007-274159 | 10/2007 |
| JP | 2012-517151 | 7/2012 |
| KR | 10-2012-0123718 | 11/2012 |
| KR | 10-2013-0044363 | 5/2013 |
| KR | 10-2013-0076780 | 7/2013 |
| WO | 2012041393 A1 | 4/2012 |
| WO | 2013/013954 A1 | 1/2013 |
| WO | 2014/053399 A1 | 4/2014 |

OTHER PUBLICATIONS

Alcatel-Lucent Shanghai Bell, Alcatel Lucent, "Proposals for X2 Signaling Enhancements for eCoMP", 3GPP TSG RAN WG1 Meeting # 74, Barcelona, Spain, Aug. 19-23, 2013.
Japanese Office Action dated Apr. 4, 2017 in corresponding Japanese Patent Application No. 2016-539423.
"Final Report of 3GPP TSG RAN WG1 #67 v1.0.0 (San Francisco, USA Nov. 14-18, 2011)", 3GPP TSG RAN WG1 Meeting #68, R1-12001, Feb. 6-10, 2012, Dresden, Germany, 89 pages.
International Search Report dated May 15, 2014 in corresponding International Patent Application No. PCT/EP2013/068444.
International Search Report dated May 15, 2014, in corresponding International Application No. PCT/EP2013/068444.
Korean Office Action dated Sep. 13, 2016 in corresponding Korean Patent Application No. 10-2016-7008740.
European Office Action dated Jul. 4, 2018 in related European Patent Application No. 13758885.1 (6 pages).
Chinese Office Action dated Aug. 21, 2018 in corresponding Chinese Patent Application No. 201380079341.6 (9 pages).

* cited by examiner

METHOD FOR SCHEDULING AND/OR MUTING OF RADIO RESOURCES IN A WIRELESS COMMUNICATION SYSTEM

CROSS REFERENCE

This application is a continuation of International Application No. PCT/EP2013/068444, filed on Sep. 6, 2013, which is hereby incorporated by reference in its entirety.

TECHNICAL FIELD

The present invention relates to a method for scheduling and/or muting radio resources in a wireless communication system. Furthermore, the invention also relates to a method in a user node, a method in a network node, corresponding user node and network node devices, a computer program, and a computer program product thereof.

BACKGROUND OF THE INVENTION

Radio interference is a major cause of performance degradation in wireless radio systems. To mitigate radio interference and aid performance, state-of-the-art radio cellular systems have adopted Inter-Cell Interference Coordination (ICIC) schemes. In the related art LTE system, for instance, two forms of ICIC are supported: frequency domain ICIC (adopted in LTE Rel. 8-9); and time domain ICIC (adopted from LTE Rel. 10).

Frequency domain ICIC relates to the usage of radio resources in the frequency domain and/or power adaptation. Current methods include:
  Full frequency reuse, (the basic operating mode of the LTE system) in which each base station uses the entire frequency spectrum with uniform power distributed across the system bandwidth, thereby creating strong interference to cell edge users.
  Hard frequency reuse, (used in the related art GSM and LTE Rel. 8-9) in which each base station operates in one out of a set of non-overlapping portions of the available frequency spectrum in such a way that neighbouring base stations do not use the same set of frequencies. While this minimizes the interference at the cell-edge, the overall spectral efficiency is reduced by a factor equal to the reuse factor.
  Fractional frequency reuse in which the available frequency spectrum is divided into two portions: a portion common to all base stations used for scheduling cell-centre users, and a second portion that is further divided among base stations in a hard frequency reuse manner and used to schedule transmission to/from cell-edge users.
  Soft frequency reuse which enables base stations to transmit in the entire frequency spectrum with different power levels: higher transmission power in the portion of the spectrum where cell-edge users are scheduled; lower transmission power in the portion of spectrum where cell-centre users are scheduled.

Time domain ICIC consists in periodically muting the transmission of a base station in certain time-frequency resources to enable a further base station to serve mobile stations suffering severe interference in the muted radio resources. The related art LTE system introduced Almost Blank Subframes (ABS), i.e., downlink subframes where only the necessary signals to avoid radio link failure or to maintain backward compatibility are transmitted, including common reference signals (except subframes configured as MBSFN), Primary and Secondary Synchronization Signals (PSS/SSS), Physical Broadcast Channel (PBCH), SIB-1 and paging with their associated PDCCH.

Time domain muting patterns are configured semi-statically by means of bitmaps of length 40, i.e., spanning up to four radio frames, signalled between eNodeBs over the X2 interface. Mobile stations in a victim cell are then categorized into two groups:
  Mobile stations affected by interference form a cell using ABS, which shall preferably be scheduled in correspondence of a muted subframe from said cell;
  And mobile stations that are not affected by the interference produced by a neighbouring cell using ABS, which can be scheduled freely in any subframe.

The above categorization is done by comparing channel quality (CSI) feedback from mobile stations in muted and non-muted subframes of a neighbouring cell.

Despite the term ICIC suggests a coordination among base stations, de facto there is no coordination in the way ABS patterns are locally decided by a base station or used by a victim base station to schedule mobile stations in its coverage area. Coordination is limited to exchanging information among base stations, such as the ABS pattern of a base station or interference indicators (e.g., the overload indicator OI and the high interference indicator HII in the LTE system) reporting whether specific radio resources suffer high, low or medium interference.

Another method to mitigate interference in the downlink of a cellular radio system is by transmission beamforming. In essence, in a multi-antenna system a base station may fine-tune the transmission of a downlink radio signal into a narrow beam in the direction of the intended receiver by mean of transmission precoding thereby reducing the interference caused to other mobile nodes in the cell coverage area.

ABS adopted in LTE Rel-10 to mitigate interference for cell-edge users, comprise Time-Domain Muting (TDM) patterns of data transmission in downlink subframes. The muting pattern of an aggressor cell (typically a macro base station) is signalled over the X2 interface to a neighbouring victim cell (typically pico base stations within the macro-cell coverage area), so that the latter can schedule mobile nodes suffering strong interference from the aggressor cell in ABS subframes of the aggressor cell. Mobile nodes in the coverage are of the victim cell are configured to perform channel quality (CSI) measurements in correspondence of ABS and non-ABS resources to enable the serving cell determine whether the mobile station is affected by strong interference from the aggressor cell. The TDM muting patterns and the scheduling decisions are independently determined by the aggressor cell and the victim cell respectively.

According to another prior art solution a method is proposed for a mobile station to determine whether it is being interfered by a neighbouring cell. The method comprises the detection that an interference condition occurs when a quality of the neighbouring cell becomes better than a quality of the serving cell by a threshold or for a certain period. The method does not consider how the ABS patterns are created and the impact on such patterns on the user scheduling.

According to yet another prior art solution the concept of ABS is extended to transmission beam coordination. In particular, it provides a method for beam coordination between an aggressor base station and a victim base station, where the interference created by a beam transmitted by an aggressor base station is measured by mobile stations in the served area of a victim base station. Depending on the measured interference, a restriction of use of radio resources is determined for the aggressor base station, which is used by the victim base station to schedule users in restricted radio resources as in the ABS case. A mobile station in the victim cell reports which beams are deemed as interfering and eventually a corresponding channel quality measure. Based on this information, the victim cell performs a ranking of interfering beams and determines a scheduling of the served users based on muted/restricted resources signalled by an aggressor cell. The aggressor cell determines a restriction of usage of radio resources based on the ranking of interfering beams at the victim cell. Coordination is limited to the exchange of information among a victim and an aggressor base stations (namely, a ranking of interfering beams and restriction of resource use, respectively), whereas local decisions are taken at the victim and the aggressor base stations (related to ranking of interfering beams and scheduling of served user terminals and the restriction of usage of radio resources for ranked interfering beams, respectively) without coordination.

SUMMARY OF THE INVENTION

An objective of the present invention is to provide a solution which mitigates or solves the drawbacks and problems of prior art solutions.

Another objective of the present invention is to provide improved interference mitigation in wireless communication compared to prior art solutions. Especially, the invention aims to provide an improved coordinated radio resource management solution.

According to a first aspect of the invention, the above mentioned objectives are achieved by a method for scheduling and/or muting radio resources in a wireless communication system, said wireless communication system comprising a plurality of network nodes and a plurality of user nodes; the method comprising the steps of:
  measuring, by at least one user node, received signal strength of radio signals transmitted from one or more network nodes so as to obtain received signal quality and/or interference associated with said one or more network nodes;
  arranging, by said user node, the received signal quality and/or interference associated with said one or more network nodes in an order or a ranking with respect to at least one radio signal criterion;
  signalling, by said user node, said order or ranking to at least one network node; and
  scheduling and/or muting radio resources based on said signalled order or ranking.

According to an embodiment of the present method, the received signal quality and/or interference relates to measurements of one or more in the group comprising: received signal energy, received signal power, received signal strength indicator, reference signal received quality, propagation loss, signal to noise ratio, and signal to noise and interference ratio.

According to another embodiment of the present method, the received signal strength relates to measurements on one or more in the group comprising: downlink reference signals, channel state reference signals, demodulation reference signals, positioning reference signals, and data channels.

According to yet another embodiment of the present method, the received signal quality and/or interference further relates to different transmission beams associated with said one or more network nodes.

According to yet another embodiment of the present method, the received signal quality and/or interference is normalised with respect to at least one reference value.

According to yet another embodiment of the present method, said at least one reference value is one or more in the group comprising: highest received signal quality and/or interference from said one or more network nodes; lowest received signal quality and/or interference from said one or more network nodes, an average received signal quality and/or interference from said one or more network nodes; received signal quality and/or interference associated with a serving network node; a predefined reference value at said at least one user node; a reference value signalled by a serving network node; and a reference value configured by the network of said wireless communication system.

According to yet another embodiment of the present method, the received signal quality and/or interference is associated with at least one set of radio resources.

According to yet another embodiment of the present method, the radio signal criterion relates to interference caused by said one or more network nodes and/or its respective associated transmission beam(s) on said at least one user node.

According to yet another embodiment of the present method, a network node and/or its respective associated transmission beam(s) is determined to cause interference on said at least one user node based on the received signal quality and/or interference associated with said one or more network nodes.

According to yet another embodiment of the present method, a network node and/or its respective associated transmission beam(s) is determined to cause interference on said at least one user node with respect to the entire bandwidth of said wireless communication system, at least one subband of the entire bandwidth, or physical resource blocks of the entire bandwidth.

According to yet another embodiment of the present method, a network node and/or its respective associated transmission beam(s) is determined to cause interference on said at least one user node by comparing the received signal quality and/or interference with at least one interference threshold value. According to this embodiment a network node and/or its respective associated transmission beam(s) is determined to cause interference if the received signal quality and/or interference exceeds the interference threshold value or exceeds the interference threshold value for a certain time period. Further, according to this embodiment said interference threshold value is selected by said at least one user node, or predefined at said at least one user node. Further, according to this embodiment said interference threshold value is configured by the network of said wireless communication system. According to this embodiment said configured interference threshold value is signalled to said at least one user node by means of a control channel or higher layer signalling.

According to yet another embodiment of the present method, the interference caused by each one of said one or more network nodes and/or its respective associated transmission beam(s) are arranged in descending or ascending order.

According to yet another embodiment of the present method, said order or ranking is signalled by means of a first message indicating said order or ranking. According to this embodiment said first message further indicates one or more in the group comprising: a list of interfering transmission beams; a list of interfering network nodes; a list of interfering network nodes in descending or ascending order of interference; an indication of interference level associated with said list of interfering transmission beam(s) and/or interfering network nodes. Further, According to this embodiment said first message only indicates the strongest interfering network node and/or its respective associated transmission beam(s) and/or an indication of its respective interference level.

According to yet another embodiment of the present method, said at least one network node request measurement(s) of received signal quality and/or interference associated with said strongest interfering network node and/or its respective associated transmission beam(s) from said at least one user node.

According to yet another embodiment of the present method, said at least one network node requests measurements of received signal quality and/or interference associated with said one or more network nodes and/or its respective associated transmission beam(s).

According to yet another embodiment of the present method, the respective interference level is associated with the entire bandwidth of said wireless communication system, at least one subband of the entire bandwidth, or physical resource blocks of the entire bandwidth.

According to yet another embodiment of the present method, the information in said first message is quantised.

According to yet another embodiment of the present method, said at least one network node is a first network node performing the step of scheduling and/or muting radio resources based on said first message. According to this embodiment, said first network node further performs the steps of:
   receiving a plurality of first messages associated with different user nodes;
   combining the indications of said plurality of first messages into at least one second message; and
   signalling said second message to one or more second network nodes. Further according to this embodiment, said second message indicates one or more in the group comprising: number of user nodes and/or its respective associated transmission beam(s) interfered by said one or more network nodes; interference caused by said one or more second network nodes on different areas served by said first network node; interference caused by said one or more second network nodes on different areas and/or user nodes served by said first network node; interference caused by at least one transmission beam associated with one of said one or more second network nodes on different areas and/or user nodes served by said first network node; at least one set of radio resources interfered by at least one second network node; radio resources, required by said first network node, to be protected from interference of other network nodes; and radio resources in which said first network node mutes the transmission of any of data channels, control channels, reference signals or combinations thereof. Further, according to this embodiment, the method further comprises the steps of:
   receiving, by a network control node, said first and/or said second messages; and
   centralised scheduling and/or muting of radio resources, by said network control node, based on said first and/or said second messages. Further, according to this embodiment the method comprises the steps of:
   signalling, by said network control node, information related to the centralised scheduling and/or muting of radio resources to said first network node and said one or more second network nodes.

According to yet another embodiment of the present method, the method further comprises the steps of:
   receiving, by said second network nodes, said second message;
   coordinating, by said first network node and said one or more second network nodes, scheduling and/or muting of radio resources based on said first and/or said second messages.

According to yet another embodiment of the present method, said wireless communication system is a cellular system and said first network node is a serving network node for said at least one user node.

According to yet another embodiment of the present method, the method further comprises the step of:
   storing and processing the received signal quality and/or interference in a database, wherein said data base is a Radio Environmental Map, REM, database.

According to yet another embodiment of the present method, the network nodes are one or more in the group comprising: base stations, NodeBs, eNodeBs, pico cell nodes, femto cell nodes, radio access points, remote radio heads, ultra-NodeBs (u-NodeBs).

According to a second aspect of the invention, the above mentioned objectives are achieved with a method in a user node arranged for communication in a wireless communication system, said wireless communication system comprising a plurality of network nodes and a plurality of user nodes; the method comprising the steps of:
   measuring received signal strength of radio signals transmitted from one or more network nodes so as to obtain received signal quality and/or interference associated with said one or more network nodes;
   arranging the received signal quality and/or interference associated with said one or more network nodes in an order or a ranking with respect to at least one radio signal criterion; and
   signalling said order or ranking to at least one network node.

According to a third aspect of the invention, the above mentioned objectives are achieved with a method in a network node arranged for communication in a wireless communication system, said wireless communication system comprising a plurality of network nodes and a plurality of user nodes; the method comprising the steps of:
   receiving an order or ranking, according to the above method in a user node, from at least one user node; and
   scheduling and/or muting radio resources based on said signalled order or ranking.

According to an embodiment of the present method in a network node, said order and ranking is received in a first message and the method further comprises the steps of:
   receiving at least one second message from other network nodes, said second message being combined indications of a plurality of first messages,
   scheduling and/or muting radio resources based on said first and/or said second messages.

According to another embodiment of the present method in a network node, the scheduling and/or muting of radio resources is coordinated with said other network nodes.

Moreover, the present method above may be comprised in a computer program which when run by processing means causes the processing means to execute the present method. A computer program product may comprise the computer program and a computer readable medium.

According to a fourth aspect of the invention, the above mentioned objectives are achieved with a user node device arranged for communication in a wireless communication system, said wireless communication system comprising a plurality of network nodes and a plurality of user nodes; said mobile device comprising a processor arranged to:

measure received signal strength of radio signals transmitted from one or more network nodes so as to obtain received signal quality and/or interference associated with said one or more network nodes;

arrange the received signal quality and/or interference associated with said one or more network nodes in an order or a ranking with respect to at least one radio signal criterion; and     signal said order or ranking to at least one network node.

According to an embodiment of the invention, wherein the user node device is a user communication device, such as: mobile phones, mobile communication devices, actuator devices, portable computers, stationary computers, sensor devices, devices for machine-type communication, and devices for machine-to-machine communication.

According to a fifth aspect of the invention, the above mentioned objectives are achieved with a network node device arranged for communication in a wireless communication system, said wireless communication system comprising a plurality of network nodes and a plurality of user nodes; said network node device comprising a processor arranged to:

receive said order or ranking according to the user node device indicated in a first message; and     schedule and/or mute radio resources based on said signalled order or ranking.

The present user node device and network node devices may be modified, mutatis mutandis, according to the different embodiments of the present method in the wireless communication system.

The present invention provides a solution to mitigate radio interference in a wireless communication system based on an indication, from at least a user node, of an order or ranking of interfering network nodes and/or its respective associated transmission beam(s) determined based on received signal quality and/or interference, which can be used for scheduling and/or muting of radio resources by one or more network nodes.

In other words, the invention provides a solution for ordering or ranking, at the user node, received signal strength of radio signals from network nodes that might generate radio interference on the user node. The invention further provides a method for signalling, from the user node, the order or ranking in a first message. Hence, the present invention also provides means for effective coordinated scheduling and/or muting of radio resources among a plurality of network nodes of the system.

Furthermore, according to preferred embodiments of the invention a mechanism is provided to exchange indicator messages of first and/or second types between different network nodes. The indicator messages indicate radio interference from network nodes measured by user nodes in the system. The indicator messages exchanged between the different network nodes is beneficial for coordinating scheduling and/or muting of radio resources among the plurality of network nodes of the system.

Further applications and advantages of the invention will be apparent from the following detailed description.

BRIEF DESCRIPTION OF THE DRAWINGS

The appended drawings are intended to clarify and explain different embodiments of the present invention in which.

DETAILED DESCRIPTION OF THE INVENTION

In addition to the above description, a massive densification of access nodes in future radio networks makes inter-cell interference management particularly difficult due to the potentially large number of interferers affecting the transmission to and from a user node. Therefore a number of new challenges related to spectral efficiency and energy savings will rise. A first major issue is to determine the interfering network nodes and/or the corresponding interfering transmission beams affecting the reception at a receiver user node, and to represent the relative amount of interference produced by each interfering network node with a suitable metric. A second major issue is how to determine in a wireless communication system inter-cell coordination of radio resource blanking/muting among a plurality of network nodes and how to combine resource blanking/muting with spatial dependent scheduling of radio resources to user nodes that most benefit from the resource blanking/muting at neighbouring (interfering) network nodes.

The present invention addresses the above and other issues by a method for scheduling and/or muting radio resources in a wireless communication system comprising a plurality of network nodes and a plurality of user nodes. Basically, the present method means that a user node measures received signal strength of radio signals transmitted from one or more network nodes in the system and obtains received signal quality and/or interference associated with the one or more network nodes. For example, the user node is connected to and served by a network node, whilst measuring received signal strength of radio signals transmitted by other network nodes. Based on the measured signal strength of radio signals from other network nodes, the user node determines a measure of received signal quality and/or interference associated with the other network nodes. However, more generally a user node can perform the above operations without being prior connected to or served by any network node. The user node arranges the received signal quality and/or interference in an order or a ranking with respect to at least one radio signal criterion Finally, the user node signals the order or ranking to at least one network node of the communication system. The network node receives the order or ranking and schedules and/or mutes radio resources based on the received order or ranking.

Figure 1:
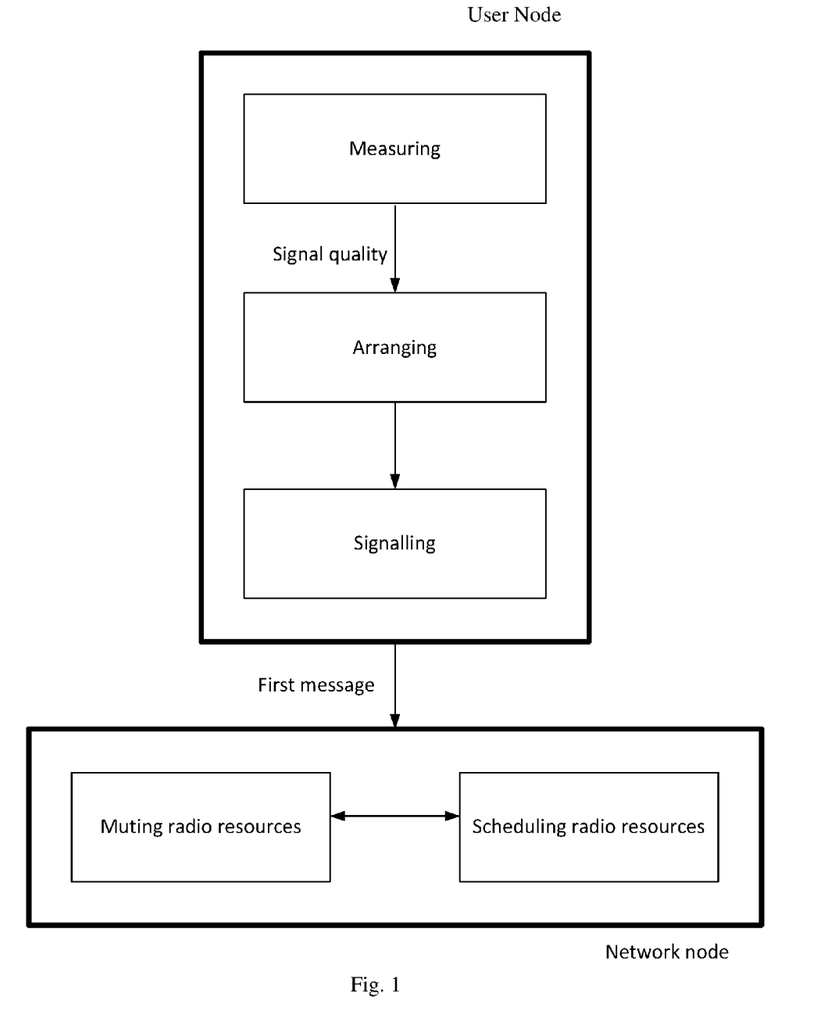
FIG. 1 illustrates a method in a wireless communication system according to an embodiment of the present invention.

FIG. 1 illustrates an embodiment of the present invention. A user node performs the steps of measuring, arranging and signalling described above. The order or ranking is indicated in a first message signalled to at least one network node of the communication system. The network node receives the first message and based on indicated order or ranking schedules and/or mutes radio resources by itself or coordinated together with other network nodes.

In the following description other preferred embodiments are described and explained and it should be noted that in the sequel, the terminology from the 3GPP LTE system (such as subframe, eNodeB, etc.) is occasionally used, but the skilled person may interchangeably consider more general notations of channels, signals, etc. with the same functionalities and properties.

According to one embodiment of the invention, a user node determines received signal quality and/or interference of radio signals transmitted by network nodes based on one or more suitable metrics. Examples of suitable metrics include, but are not limited to, received signal energy, received signal power (e.g., the Reference Signal Received Power, RSRP, in the related art LTE system), Received Signal Strength Indicator (RSSI), Reference Signal Received Quality (RSRQ), a measure of propagation loss, Signal to Noise Ratio (SNR), Signal to Noise and Interference Ratio (SINR), or any other corresponding metric. In one example, the reception quality of signals transmitted by network nodes, and measured by a user node, represents the interference caused by the network nodes on the user node.

According to a further embodiment, the user node measures the received signal strength on reference signals or data channels transmitted by a network node. Reference signals can preferably be specific to the network node or specific to the user node. In the former case, the reference signals may be related in any way to a physical or virtual identity of the network node, and in the latter case the reference signals may be related to an identity of a user node. In the related art LTE system, examples of reference signals of the first kind are downlink Common Reference Signals (CRS), Channel State Information Reference Signals (CSI-RS) and Positioning Reference Signals (PRS), whilst examples of reference signals of the second kind are Demodulation Reference Signals (DMRS). It is however noted that also cell-specific demodulation reference signals can also be used for this purpose.

According to yet another embodiment of the invention, the received signal quality and/or interference of a radio signal is associated with a transmission beam from a network node. The user node can therefore associate the received signal quality and/or interference of a radio signal with the network node itself or with a particular transmission beam from that particular network node.

To associate the received signal quality and/or interference of a radio signal to a network node, the user node can measure the received signal quality and/or interference for a non-precoded reference signal, such as CRS or CSI-RS in the related art LTE system. In order to associate the measured reception quality and/or interference of a signal to a transmission beam, the user node can either measure the received signal quality and/or interference of a precoded signal, such a DMRS, or measure the received signal quality and/or interference of a non-precoded reference signal in combination with the used precoding vector used for data transmission.

According to yet further embodiment of the invention, the user node determines a normalized received signal quality and/or interference, where the metric representing the received signal quality and/or interference associated with a network node is normalized with respect to a reference value. For instance, a normalized expression of the Reference Signal Received Power (RSRP), expressed in linear scale, is:

$$RSRP_{c,norm} = RSRP_c / RSRP_{ref}$$

where $RSRP_{ref}$ and $RSRP_c$ are the reference RSRP and the RSRP measured from a network node c, respectively. Similar normalization can be done for any other metrics representing the received signal quality and/or interference from a network node, such as: received signal energy, RSRQ, RSSI, SNR, SINR, propagation loss to the user node, etc. Examples of suitable reference values include:

Highest measured received signal quality and/or interference from the one or more network nodes;
Lowest measured received signal quality and/or interference from the one or more network nodes;
Average measured received signal quality and/or interference from the one or more network nodes;
Measured received signal quality and/or interference from the network node serving the user node;
Received signal quality and/or interference associated with a serving network node;
Reference value signalled by a serving network node;
Predefined reference value at the user node;
Reference value configured by the network of the wireless communication system.

An advantage of normalizing the measurements of received signal quality and/or interference is to enable to scale and to compare the received signal quality and/or interference measured from different network nodes.

According to yet another embodiment of the invention the user node blindly measures energy in at least one set of time-frequency resources of the radio channel. In this embodiment a generic sensor (e.g., a plain "radio meter") in a user node measures the radio field strength in a certain portion of the frequency band, not necessarily being the portion of the spectrum where the user node is currently being served by a network node. Hence, in this case, the measurements of the radio field may not be associated with the transmission of any known reference signals or data channels. Thereby, the measured strength of the radio field is representative of the potential interference, in a particular geographical area, on user nodes and not necessarily associated with a particular network node or transmission beam.

The above discussed user node arranges the received signal quality and/or interference of radio signals transmitted from the one or more network nodes according to a suitable criterion. The arrangement can be an ordering or a ranking according to the suitable criterion. The result of this arrangement step in the user node is according to an embodiment of the invention a first message reflecting the arrangement by indicating the order or ranking. Typically, the size of the resulting indicator is much smaller than the aggregate size of all the received signal quality and/or interference. In other words, an advantage of the arrangement is to provide a compression of the indication in the first message which reduces overhead.

One very suitable criterion for this arrangement is the interference caused/produced by a network node or a transmission beam on a user node, in which case the resulting first message provides (at least) an arrangement of the network nodes based on the individual interference produced at the receiver of the user node.

According to one embodiment, the user node determines whether a network node and/or a transmission beam from a network node is interfering on the basis of a measured received signal quality and/or interference which may according to another embodiment of the invention relate to certain time-frequency radio resources of the system. Interfering network nodes and/or transmission beams are then arranged into a first message according to a certain criterion, such as an ordering or a ranking of the corresponding measurements. In one example, the arrangement is representative of the relative strength of the (individual) interference created by each network node at the receiving user node, e.g., such that the interference caused by each one of the network nodes and/or its respective associated transmission beams are arranged in descending or ascending interference order, accordingly.

According to a further embodiment, a network node or a transmission beam associated with a network node is determined as interfering on the basis of at least one threshold value of the received signal quality and/or interference from the network node. In one exemplifying case, a network node or a transmission beam is deemed interfering when a metric representing the received signal quality and/or interference exceeds an interference threshold value or when an interference threshold value is exceeded for at least a certain amount of time. In another example a network node or a transmission beam is determined as interfering when the received signal quality and/or interference from the network node is within a threshold of the signal quality and/or interference of another network node serving the mobile station. The advantage of this embodiment is to enable the user node to determine a set of interfering network nodes and/or interfering transmission beams and, in combination with previous embodiments, rank the interfering network nodes and/or interfering transmission beams for improved scheduling and/or muting of radio resources.

In both cases, the threshold value can be selected by the user node; predefined at the user node; or configured by the network of the communication system either dynamically (e.g., by means of physical layer signalling) or semi-statically (e.g., by means of higher layer Radio Resource Control (RRC) signalling). An advantage of this embodiment is to limit the number of interfering network nodes reported in a first message. It is also realized that multiple thresholds can used e.g., at the user node, with a further advantage of enabling a finer classification of interfering network nodes and/or its respective associated transmission beams(s) on the basis of exceeded threshold by the corresponding interference metric.

According to yet another embodiment, the first message comprises an arrangement of interfering network nodes and/or a list of interfering transmission beams in ascending or descending order of measured received signal quality and/or interference. The first message may comprise a list of network nodes' identity, or a bitmap reflecting a list of network nodes and/or transmission beams known to both the transmitter of the first message and the receiver of the first message. Further, the interference level associated with the list of interfering transmission beam(s) and/or interfering network nodes in descending or ascending order of interference may also be comprised in the first message according to this embodiment. The advantage of this embodiment is to enable a user node to signal a list of interfering network nodes to the network with reduced signalling overhead.

According to yet another embodiment of the invention, the first message comprises the identity of at least one network node and/or a related indicator of interference. In one example, the indicator message comprises only the identity of the network node and/or its respective associated transmission beam(s) determined to be the strongest interferer and/or an indicator of the corresponding interference. In a further embodiment, the first message comprises at least an indicator of a transmission beam determined to be the strongest interferer and/or a related indicator of interference from the strongest interferer. This has the advantage of minimizing the signalling overhead, while enabling the serving network node determine the strongest interferer (or a set of interferers) affecting the reception at a certain user node or a geographical position within the serving area of said network node.

In another embodiment of the invention, the first message comprises not only an arrangement of interfering network nodes but also an indication of the individual interference created by the network nodes on a user node. In one example, the additional information is conveyed with a fixed number of bits. For instance, by using two bits the user nodes may indicate up to four levels of interference for each interfering network node, e.g., low, medium-low, medium-high, and high interference. In another example, the first message comprises only an indicator of the interference level corresponding to at least one network node, for instance the network node (or a set of network nodes), determined to be the strongest interferer(s). The identity of the interfering network nodes can be either known at the receiver of the first message or signalled in a separate indicator message to mentioned receiver.

The first message may further represent an indication of which radio resources, such as time-frequency resource blocks, are affected by interference. Hence, according to another embodiment of the invention, the arrangement of the measured received signal quality and/or interference reported in a first message may represent a set of radio resources, such as time-frequency resource blocks. The received signal strength used for ranking of interfering network nodes can be quantized with a finite number of bits and signalled from a user node to one or more network nodes. Therefore, the quantization of the indicated information can be either wide-band, i.e., referring to the entire frequency spectrum measured by the user node, or narrow-band, i.e., representative of sub-band (e.g., resource blocks in LTE). This has the advantage of enabling a trade-off between the accuracy of the reported information and signalling overhead.

As explained, a user node reports an indicator message in the form of a first message reflecting an arrangement of interfering network nodes. In a conventional radio cellular system, such as the related art LTE system, the user node would transmit the first message to a serving network node. The first message can therefore be formatted as control information and transmitted over a physical uplink control channel; or the first message can be transmitted as part of the data channel (e.g., by higher layer RRC signalling). In more advanced communication systems, the user node can broadcast the indicator message to any network node and/or user nodes in its proximity, thereby including the interfering network nodes arranged in the first message.

In the case that the first message comprises the identity of at least one interfering network node or its associated transmission beams, the network node serving the user node may request the user node to report measurements of the received signal quality and/or interference for at least one interfering network node indicated in the first message. The advantage of this embodiment is to minimize the signalling overhead from the user node to the network node.

The method steps in the user node have been considered in the above description, however at the network side, reception of the signalled first message(s) from the user node, allows a number of actions, e.g., individual scheduling and/or muting, coordinated scheduling and/or muting across network nodes, and network operational optimizations related to the radio resource management that would not be possible without the first message(s). In these usages radio resources are intended at least as any of time, frequency, and transmission power resources, or combinations thereof.

According to yet another embodiment of the invention, a first network node combines a plural of first messages received from multiple user nodes into one or more second message. In one example, the second message is signalled to one or more second network nodes. In a further example, the second message is signalled to a group of neighbouring network nodes, by the first network node. Examples of the information carried in the second message are according to different embodiments:

- An indication of the number of user nodes interfered by one or more network nodes and/or its respective associated transmission beam(s);
- An arrangement of the interference produced by network nodes on different geographical areas served by the first network node;
- An arrangement of interfering network nodes with respect to user nodes and/or different geographical areas served by the first network node;
- An arrangement of the interference produced by at least one transmission beam of at least one second network node;
- Time-frequency radio resources in which at least a second network node and/or a transmission beam produces interference;
- Radio resources (e.g., time-frequency) required by the first network node to be protected from interference created by another network node such as a second network node;
- Radio resources (e.g., time-frequency) in which the first network node mutes the transmission of any of data channels, control channels, reference signals or combinations thereof.

When the second message signalled by the first network node contains an indication of time-frequency radio resources to be protected from (inter-cell) interference created by a network node, a second network node receiving the second message can use the information to determine scheduling and/or muting of its radio resources. When the second message signalled by the first network node carries an indication of time-frequency resources and/or a pattern of time-frequency resource muted by the first network node, a second network node receiving the second message can use it, possibly in combination with messages of the first type, to schedule radio resources to user nodes in its serving area.

According to yet further embodiment of the invention, the messages of first and/or the second types are utilized by network nodes for coordinated (distributed) scheduling and/or muting of radio resources to user nodes, eventually across multiple network nodes in the system. This means that the present method further comprises the following steps in a network node: receiving a first and/or a second message; and scheduling and/or muting radio resources coordinated together with one or more other network nodes based on the received first and/or second message. The advantage of this embodiment is to enable coordination of scheduling and/or muting of radio resources among a plurality of network nodes. The coordination mechanism based on the first and/or second message requires the network nodes to take individual or coordinated actions to mitigate interference to user nodes.

According to a further embodiment, the messages of first and/or the second types are utilized by a network control node for centralized scheduling of radio resources to user nodes, eventually across multiple network nodes, and/or coordinated muting of radio resources at the network nodes. This means that the present method further comprises the following steps in a control node: receiving the first and/or the second messages; and scheduling and/or muting of radio resources based on the first and/or the second messages. Based on the information carried in the first and/or the second messages, a network control node can determine the scheduling and/or muting of radio resources for a plurality of network nodes (and corresponding served user nodes) in a centralized manner One example is the operation of cluster of cells in a radio communication system, such as small cells in the related art LTE system, in which a network node acts as cluster master, and administers (either fully or partially) the resource management for a plurality of network nodes in the cluster. Another example is the case of cloud Radio Access Network (RAN), where the resource management of a large number of network nodes is administrated centrally in one processing unit not necessarily collocated in any of the network nodes. To control the scheduling and/or muting of radio resources the control network node can signal information related to the centralised scheduling and/or muting to the network nodes to be controlled. Suitable network control nodes are e.g., a computing and processing unit, a macro base station, and eNodeB, a ultra-NodeB (u-NodeB), a pico base station, a small cell node, a femto node, a home node, or any other network nodes with the corresponding functionalities.

Figure 2:
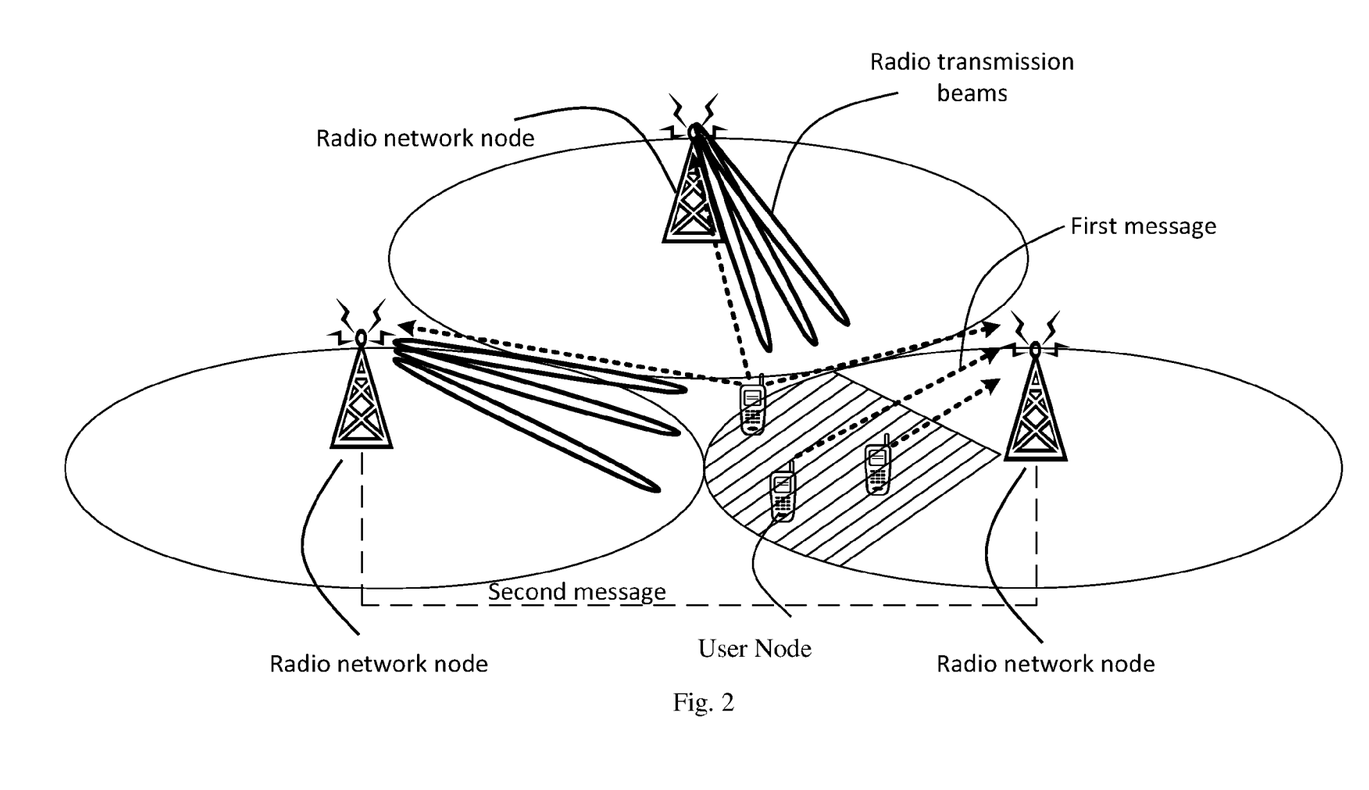
FIG. 2 illustrates the usage of a first and a second message in a wireless communication system according to the invention.

FIG. 2 illustrates an example of usage of first and second indicator messages at a network node. Based on first messages reporting an arrangement of interfering network nodes from a plurality of user nodes, the first (serving) network node groups user nodes based on the strongest interfering network node and/or interfering transmission beams. The first network node uses the first message for scheduling radio resources. Other network nodes use the received first and second messages for determining scheduling and/or muting of radio resources. Moreover, FIG. 2 further illustrates an example where a first network node combines and processes the information received in a plural of first messages into a second message. The second message is transmitted from a first network node to at least one second network node. Upon receiving messages of the first and/or second type, a network node schedules and/or mutes radio resources by its own or coordinates with other network nodes of the system in order to mitigate the interference created on user nodes. In one example, a network node can use downlink power control instead of muting the radio resources indicated as affected by strong interference associated to said network node in a message of the first or second type. Messages of the first and/or second type can further be received by a network control node administrating the radio resource management of a group of network nodes, and be used to determine scheduling and/or muting of radio resources for the group of network nodes in a centralized manner.

One usage of the first and/or the second message is the scheduling of radio resources to user nodes. Another usage of the first message is to coordinate muting of radio resources. Muting of radio resources is intended as a restriction of usage of radio resources. The restriction of usage is intended to apply either to transmission beam(s) of a network node or to a network node itself (for instance, when a single beam is transmitted by a network node). For instance, muting can represent the determination of an ABS pattern as intended in the related art LTE system, as well as a complete muting of the network node transmissions or a transmission beam over a set of time-frequency radio resources. In another example, muting of radio resources is intended as downlink power control. In this regard, the indicator messages of first and second types can be used at a network node to determine the downlink transmission power of at least one transmission beam over a set of time-frequency radio resources.

According to yet another embodiment, a first network node schedules a transmission to at least one user node in time-frequency radio resources that are muted by a second network node, which is reported as an interfering node in an indicator message by the user node. Therefore, the first network node determines a time-spatial scheduling pattern of radio resources based on the first messages (reporting an arrangement of interfering network nodes) received from user nodes and the resource muting pattern of at least a second network node. In one example, as illustrated in FIG. 2, a network node receiving an arrangement of interfering network nodes or transmission beams in a first message from a user node determines a group of user nodes that are affected by the same strongest interfering network node and/or transmission beam. This information can then be used to schedule users in radio resources that are muted for the interfering network node and/or transmission beam. In another example, the network node uses the received indicator message to arrange in an order, a group of network nodes and/or transmission beams, affecting the reception at one mobile station or a group of mobile stations of the system.

Moreover, the concept of Radio Environmental Map (REM) has been proposed in the art as a means for a network to collect process and store radio-environmental information relevant to a network operation. In general, REMs can be thought of as databases or knowledge bases in which different kinds of radio environmental information can be stored. Examples of relevant information types include locations of transmitters and receivers, models of the propagation environment, and various spectrum use measurements conducted by wireless communication devices. Based on such information further details of the radio environment can be estimated and modelled, such as levels of interference a particular transmission would cause in its surroundings.

Figure 3:
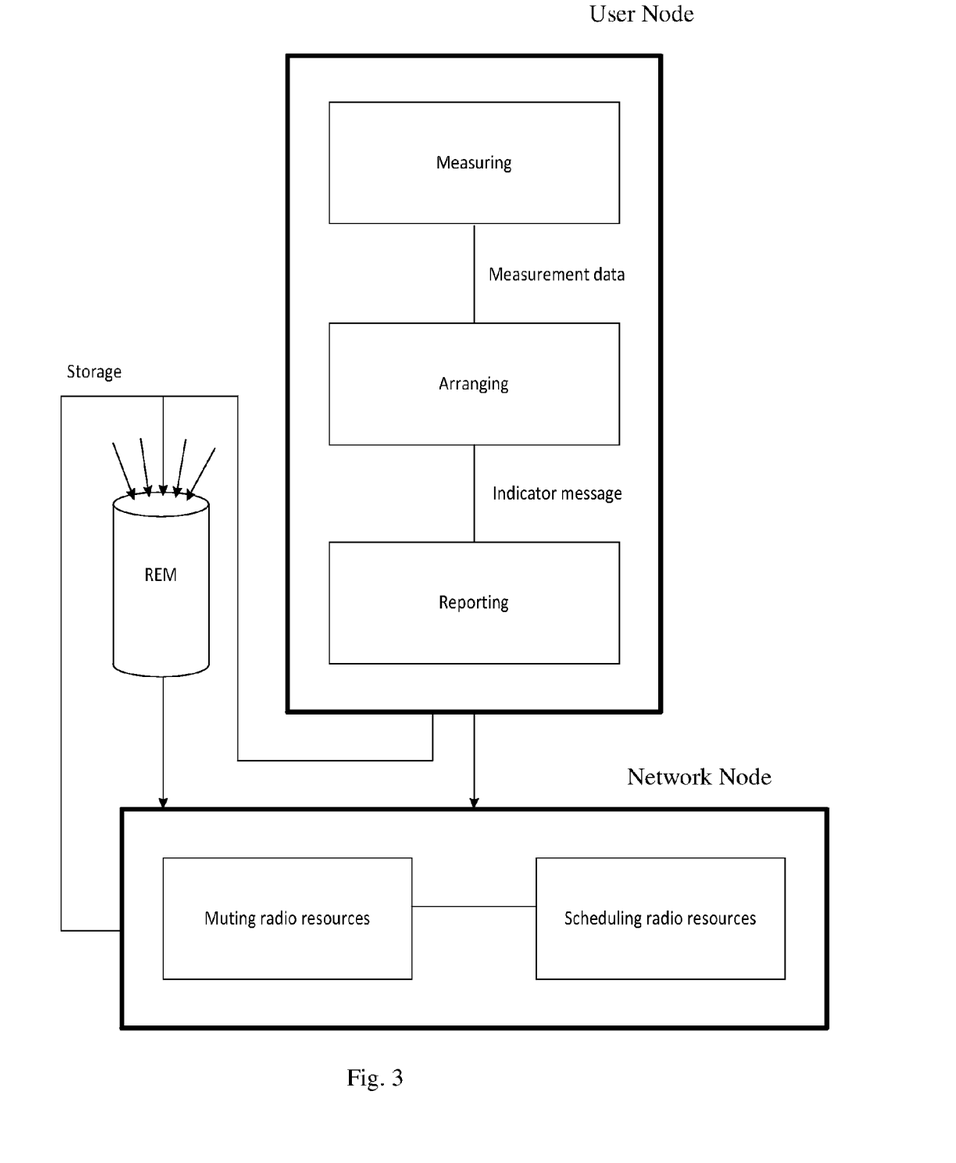
FIG. 3 illustrates information storage according to the invention.

Therefore, according to one embodiment of the invention the signalling of the first and/or second messages in the signalling step is performed into or via a REM by user nodes and network nodes, respectively. The REM serves as a database where measured received signal qualities (along with potentially other messages and information) are stored and processed. Information in this REM is then available for any network node on request. In particular, muting and scheduling decisions by a network node can be done by this node after requesting relevant information from the REM. In essence, this embodiment includes a database storage step in between the user node and the network node as illustrated in FIG. 3. The information carried by messages of the first kind is stored in a database unit to form a REM. In one example, the REM represents an interference map in which, each location associated with a user node signalling a first message is associated with an interference value corresponding to the network nodes and/or its respective associated transmission beams reported in the first message. The first message can be either received by the network unit in which the REM is stored, for instance a network node, or the network nodes can further (re)transmit the first message to the network unit where the REM is stored.

Moreover, as understood by the person skilled in the art, any method according to the present invention may also be implemented in a computer program, having code means, which when run by processing means causes the processing means to execute the steps of the method. The computer program is included in a computer readable medium of a computer program product. The computer readable medium may comprises of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Furthermore, the present method can be implemented and executed in suitable communication devices, i.e., a user node device and a network node device arranged for communication in wireless communication systems. It is realised by the skilled person that the present communication devices may comprise the necessary communication capabilities in the form of e.g. functions, means, units, elements, etc., for executing the methods according to the invention which means that the devices can be modified, mutatis mutandis, according to any method of the present invention. Examples of other such means, units, elements and functions are: memory, encoders, decoders, mapping units, multipliers, interleavers, deinterleavers, modulators, demodulators, inputs, outputs, antennas, amplifiers, DSPs, etc. which are suitably arranged together.

Especially, the processors of the present communication devices may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Figure 4:
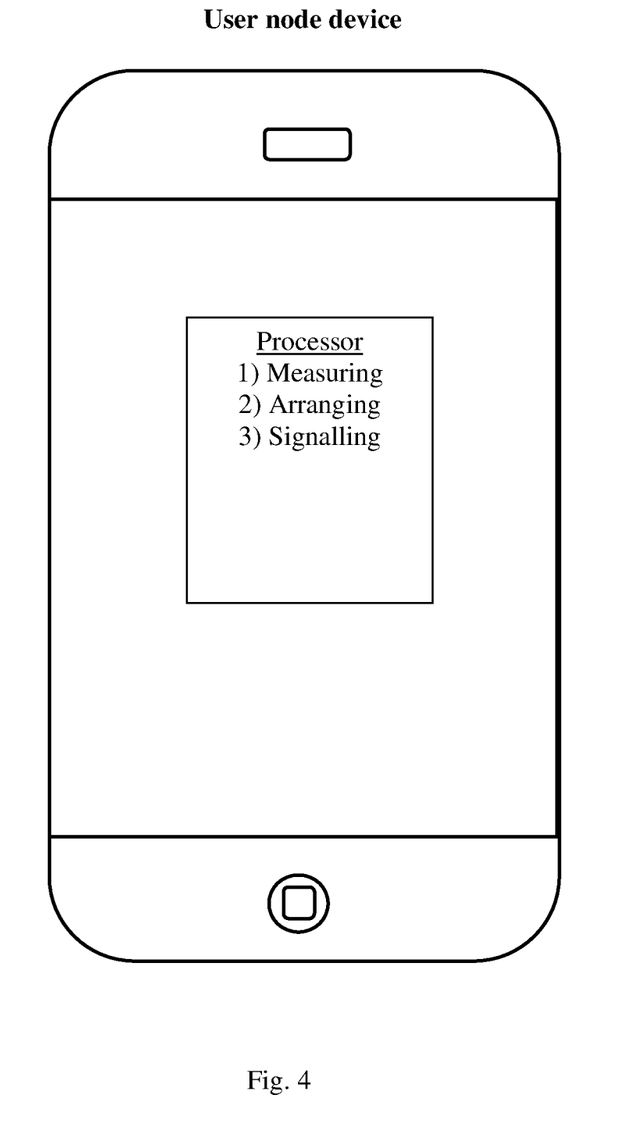
FIG. 4 illustrates a user node device according to the invention.

The present user node device comprises a processor which is arranged to: measure received signal strength of radio signals transmitted from one or more network nodes so as to obtain received signal quality and/or interference associated with said one or more network nodes; arrange the received signal quality and/or interference associated with the one or more network nodes in an order or a ranking with respect to at least one radio signal criterion; and signal the order or ranking to at least one network node of the system. This embodiment is illustrated in FIG. 4. A user node may be any suitable user communication device arranged for communication in a wireless communication system, such as a mobile communication device, an actuator device, a mobile phone, a portable computer (laptop), a stationary computer, a sensor device, a device for machine-type communication, a device for machine-to-machine communication, etc.

Figure 5:
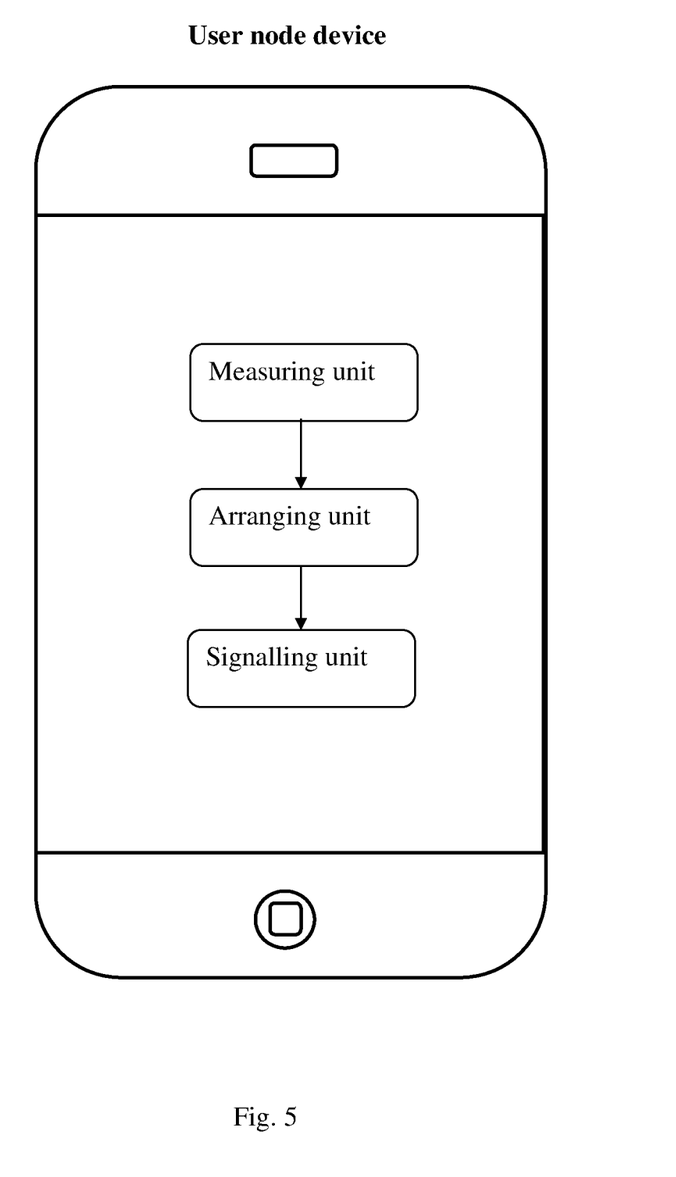
FIG. 5 illustrates an alternative user node device according to the invention.

Alternatively, according to another embodiment of the invention the present user node device comprises a measuring unit, an arranging unit, and a signalling unit together arranged such that: the measuring unit measures received signal strength of radio signals transmitted from one or more network nodes so as to obtain received signal quality and/or interference associated with the one or more network nodes; the arranging unit arranges the received signal quality and/or interference associated with the one or more network nodes in an order or a ranking with respect to at least one radio signal criterion; and the signalling unit signals the order or ranking to at least one network node. This embodiment is illustrated in FIG. 5.

Figure 6:
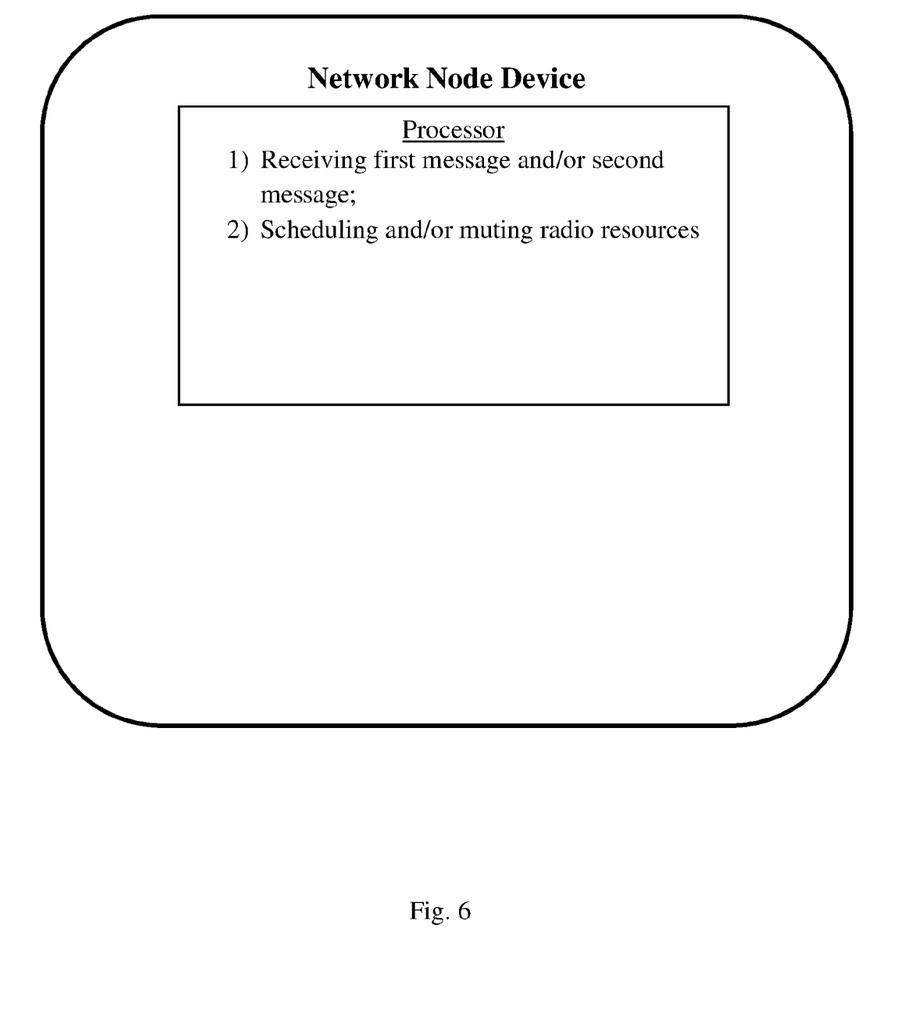
FIG. 6 illustrates a network node device according to the invention.

Furthermore, the present network node device comprises a processor which is arranged to receive the order or ranking indicated in a first message; and schedule and/or mute radio resources based on the signalled order(s) or ranking(s). The network node device may further be arranged to receive second messages described above. This embodiment is illustrated in FIG. 6.

Figure 7:
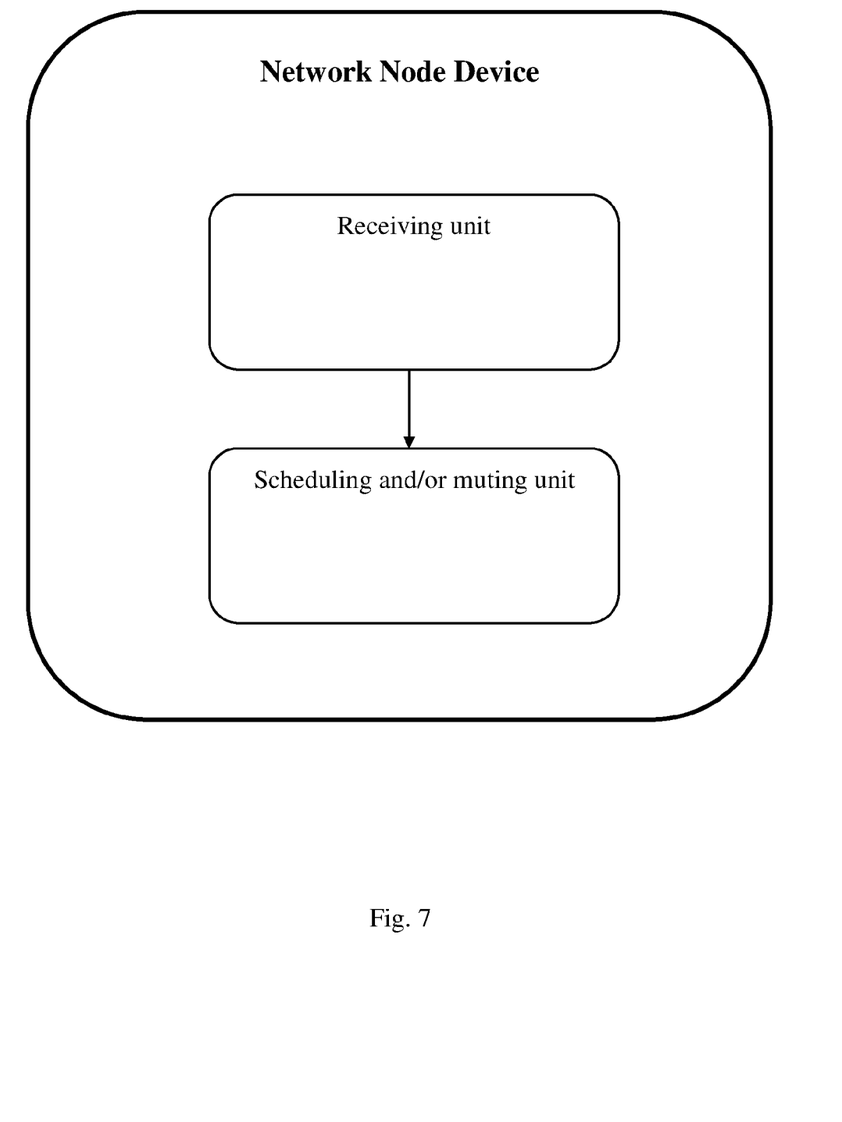
FIG. 7 illustrates an alternative network node device according to the invention.

Alternatively, according to another embodiment of the invention the network node device comprises a receiving unit, and a scheduling and/or muting unit together arranged such that: the receiving unit receives the order or ranking indicated in a first message; and the scheduling and/or muting unit schedules and/or mutes radio resources based on the signalled order or ranking. Also in this case the network node device may further be arranged to receive and transmit second messages described above which is well understood by the skilled person. This embodiment is illustrated in FIG. 7.

It is understood by the skilled person that the present invention may be used in any suitable wireless communication system for interference mitigation. Examples of such suitable systems are radio cellular networks, heterogeneous networks, and radio access networks.

Finally, it should be understood that the present invention is not limited to the embodiments described above, but also relates to and incorporates all embodiments within the scope of the appended independent claims.

The invention claimed is:

1. A method of scheduling and/or muting radio resources in a wireless communication system, said wireless communication system comprising a plurality of network nodes and a plurality of user nodes, the method comprising:
    performing measurements, by a user node among the plurality of user nodes, received signal strength of radio signals transmitted from the plurality of network nodes so as to obtain received signal quality and/or interference associated with the plurality of network nodes;
    arranging, by said user node, the received signal quality and/or interference associated with the plurality of network nodes in accordance with a first order with respect to a radio signal criterion; and
    instead of sending the measurements to a first network node among the plurality of network nodes, signalling, by said user node, an order indicator to indicate the first order in a first message to the first network node, to cause the first network node coordinate scheduling and/or muting of radio resources for the first network node based on a combination of the order indicator indicating the first order, and a second order, by the first network node, of scheduling and/or the muting of radio resources,
    wherein the first message to cause the first network node to coordinate the scheduling and/or the muting of radio resources further includes identification information arranged in accordance with the first order from a group of identification information including:
        a list of a plurality of network nodes in the first order being a descending or ascending order with respect to the radio signal criterion; and
        an indication of interference level in the first order associated in a list of a plurality of transmission beam(s) and/or a plurality of network nodes.

2. The method according to claim 1, wherein the received signal quality and/or interference relates to one or more measurements of signals in a group comprising: received signal energy, received signal power, received signal strength indicator, reference signal received quality, propagation loss, signal to noise ratio, and signal to noise and interference ratio.

3. The method according to claim 1, wherein the received signal strength relates to one or more measurements of signals in a group comprising: downlink reference signals, channel state reference signals, demodulation reference signals, positioning reference signals, and data channels.

4. The method according to claim 2, wherein the received signal quality and/or interference further relates to different transmission beams associated with the plurality of network nodes.

5. The method according to claim 1, wherein the received signal quality and/or interference is associated with at least one set of radio resources.

6. The method according to claim 1, wherein the radio signal criterion relates to the interference caused by the plurality of network nodes and/or respective associated transmission beam(s) of the plurality of network nodes on said user node.

7. The method according to claim 1, wherein said first message further indicates for the plurality of network nodes, a strongest interfering network node, an associated transmission beam of a strongest interfering network node, and/or an indication of an interference level of a strongest interfering network node.

8. The method according to claim 1, wherein the signalling includes a plurality of first messages signalled by a plurality of different user nodes, and
    by said first network node:
        receiving the plurality of first messages associated with the different user nodes;
        combining indications of said plurality of first messages into a second message; and
        signalling said second message to a second network node among the plurality of network nodes.

9. The method according to claim 8, wherein said second message indicates one or more information in a group comprising:
    number of the different user nodes and/or respective associated transmission beam(s) of the different user nodes interfered by the plurality of network nodes;
    interference caused by said second network node on different areas served by said first network node;
    interference caused by said second network node on different areas and/or user nodes served by said first network node;
    interference caused by at least one transmission beam associated with said second network node on different areas and/or user nodes served by said first network node;
    at least one set of radio resources interfered by said second network node;
    radio resources, required by said first network node, to be protected from interference of other network nodes among the plurality of network nodes; and
    radio resources in which said first network node mutes transmission of any of data channels, control channels, reference signals, or any combinations thereof.

10. The method according to claim 8, further comprising:
    receiving, by a network control node, said first and/or said second messages; and
    scheduling and/or muting of radio resources, by said network control node, based on said first and/or said second messages.

11. The method according to claim 10, further comprising:

signalling, by said network control node, information related to the scheduling and/or muting of radio resources to said first network node and said second network node.

12. The method according to claim 8, further comprising:
receiving, by said second network node, said second message;
coordinating, by said first network node and said second network node, scheduling and/or muting of radio resources based on said first and/or said second messages.

13. The method according to claim 1, further comprising:
storing and processing the received signal quality and/or interference in a database, wherein said database is a Radio Environmental Map (REM) database.

14. A method in a user node among a plurality of user nodes arranged for communication in a wireless communication system, said wireless communication system comprising a plurality of network nodes and the plurality of user nodes, the method comprising:
measuring received signal strength of radio signals transmitted from the plurality of network nodes to obtain received signal quality and/or interference associated with the plurality of network nodes;
arranging the received signal quality and/or interference associated with the plurality of network nodes in a first order with respect to a radio signal criterion; and
signalling order indicator information indicating the first order of the received signal quality and/or interference in a first message to a first network node among the plurality of network nodes, to cause the first network node coordinate schedules and/or mutes of radio resources for the first network node based on a combination of the order indicator information indicating the first order of the signal quality and/or interference associated with the plurality of network nodes in the first message from the user node, and a second order, by the first network, of schedules and/or mutes of radio resources,
wherein the first message to cause the first network node to coordinate the scheduling and/or the muting of radio resources further includes information from a group of information including:
a list of a plurality of network nodes in the first order being a descending or ascending order with respect to the radio signal criterion; and
an indication of interference level in the first order associated in a list of a plurality of transmission beam(s) and/or a plurality of network nodes.

15. A method in a network node arranged for communication in a wireless communication system, said wireless communication system comprising a plurality of network nodes and a plurality of user nodes, the method comprising:
receiving said first message according to claim 14 from a user node among the plurality of user node; and
scheduling and/or muting radio resources based on said first message.

16. The method according to claim 15, wherein the method further comprises:
receiving a second message from other network nodes among the plurality of network nodes, said second message being combined indications of a plurality of first messages,
scheduling and/or muting radio resources based on said first and/or said second messages.

17. A non-transitory computer readable medium storing a computer program, which when run by a processor causes said processor to execute said method according to claim 1.

18. The non-transitory computer readable medium according to claim 17, wherein said computer program is included in the non-transitory computer readable medium including one or more non-transitory computer readable media from a group comprising: ROM (Read-Only Memory), PROM (Programmable ROM), EPROM (Erasable PROM), Flash memory, EEPROM (Electrically EPROM) and hard disk drive.

19. A user node device among a plurality of user node devices arranged for communication in a wireless communication system, said wireless communication system comprising a plurality of network nodes and the plurality of user nodes, said user node device comprising a processor to:
measure received signal strength of radio signals transmitted from the plurality of network nodes to obtain received signal quality and/or interference associated with the plurality of network nodes;
arrange the received signal quality and/or interference associated with the plurality of network nodes in a first order with respect to a radio signal criterion; and
signal order indicator information indicating the first order of the received signal quality and/or interference in a first message to a first network node among the plurality of network nodes to control the first network node, to cause the first network node coordinate schedules and mutes of radio resources for the first network node based on a combination of the order indicator information indicating the first order of the signal quality and/or interference associated with the plurality of network nodes in the first message from the user node, and a second order, by the first network, of schedules and/or mutes of radio resources,
wherein the first message to cause the first network node to coordinate the scheduling and/or the muting of radio resources further includes information from a group of information including:
a list of a plurality of network nodes in the first order being a descending or ascending order with respect to the radio signal criterion; and
an indication of interference level in the first order associated in a list of a plurality of transmission beam(s) and/or a plurality of network nodes.

20. A network node device arranged for communication in a wireless communication system, said wireless communication system comprising a plurality of network nodes and a plurality of user nodes, said network node device comprising a processor arranged to:
receive said first message according to claim 19 from a user node among the plurality of user nodes; and
schedule and/or mute radio resources based on said first message.

* * * * *